(12) United States Patent
Umezaki

(10) Patent No.: US 7,496,114 B2
(45) Date of Patent: Feb. 24, 2009

(54) IP IMAGE TRANSMISSION APPARATUS

(75) Inventor: Yasushi Umezaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 738 days.

(21) Appl. No.: 11/105,914

(22) Filed: Apr. 14, 2005

(65) Prior Publication Data
US 2005/0175036 A1    Aug. 11, 2005

Related U.S. Application Data

(63) Continuation of application No. PCT/JP03/04854, filed on Apr. 16, 2003.

(51) Int. Cl.
*H04J 1/00*    (2006.01)
(52) U.S. Cl. ..................... 370/489
(58) Field of Classification Search .......... 370/490
See application file for complete search history.

(56) References Cited

U.S. PATENT DOCUMENTS

| | | | |
|---|---|---|---|
| 5,506,957 A * | 4/1996 | Fry et al. | 714/9 |
| 5,691,948 A * | 11/1997 | Sakabe | 365/227 |
| 5,862,437 A * | 1/1999 | Kutsuwada et al. | 399/88 |
| 6,449,732 B1 * | 9/2002 | Rasmussen et al. | 714/12 |

FOREIGN PATENT DOCUMENTS

| | | |
|---|---|---|
| JP | 11-112934 | 4/1999 |
| JP | 2000-236403 | 8/2000 |
| JP | 2001-268516 | 9/2001 |
| JP | 2003-018525 | 1/2003 |
| JP | 2003-061022 | 2/2003 |
| WO | WO00/43868 | 7/2000 |

OTHER PUBLICATIONS

International Search Report dated Aug. 5, 2003.

* cited by examiner

*Primary Examiner*—Anh-Vu H Ly
(74) *Attorney, Agent, or Firm*—Katten Muchin Rosenman LLP

(57) ABSTRACT

An IP image transmission apparatus for TCP and UDP transmission of encoded data includes a storage medium, a first memory, a first bus, a second bus, an encoder for encoding image and audio data into encoded data and outputting the encoded data to the first bus, an encoded data transfer unit for writing the encoded data output to the first bus into the first memory through the second bus, a storage data writing controller for writing the encoded data output to the first bus into the storage medium through the first bus, and a storage data reading controller for reading storage data written in the storage medium through the first bus and writing the storage data into the first memory through the second bus.

6 Claims, 13 Drawing Sheets

IP IMAGE TRANSMISSION APPARATUS

CROSS-REFERENCE TO RELATED APPLICATION

This is a continuation of PCT International Application NO. PCT/JP03/04854, filed Apr. 16, 2003, which was not published in English, currently pending, the contents of which are herein wholly incorporated by reference.

BACKGROUND OF THE INVENTION

1. Field of the Invention

The present invention relates to an image transmission apparatus for distributing images using an IP network (IP image transmission apparatus), and more particularly to a data bus system which is required to realize a live distribution function (UDP transmission) and a server storage function (TCP transmission).

2. Description of the Related Art

Figure 7:
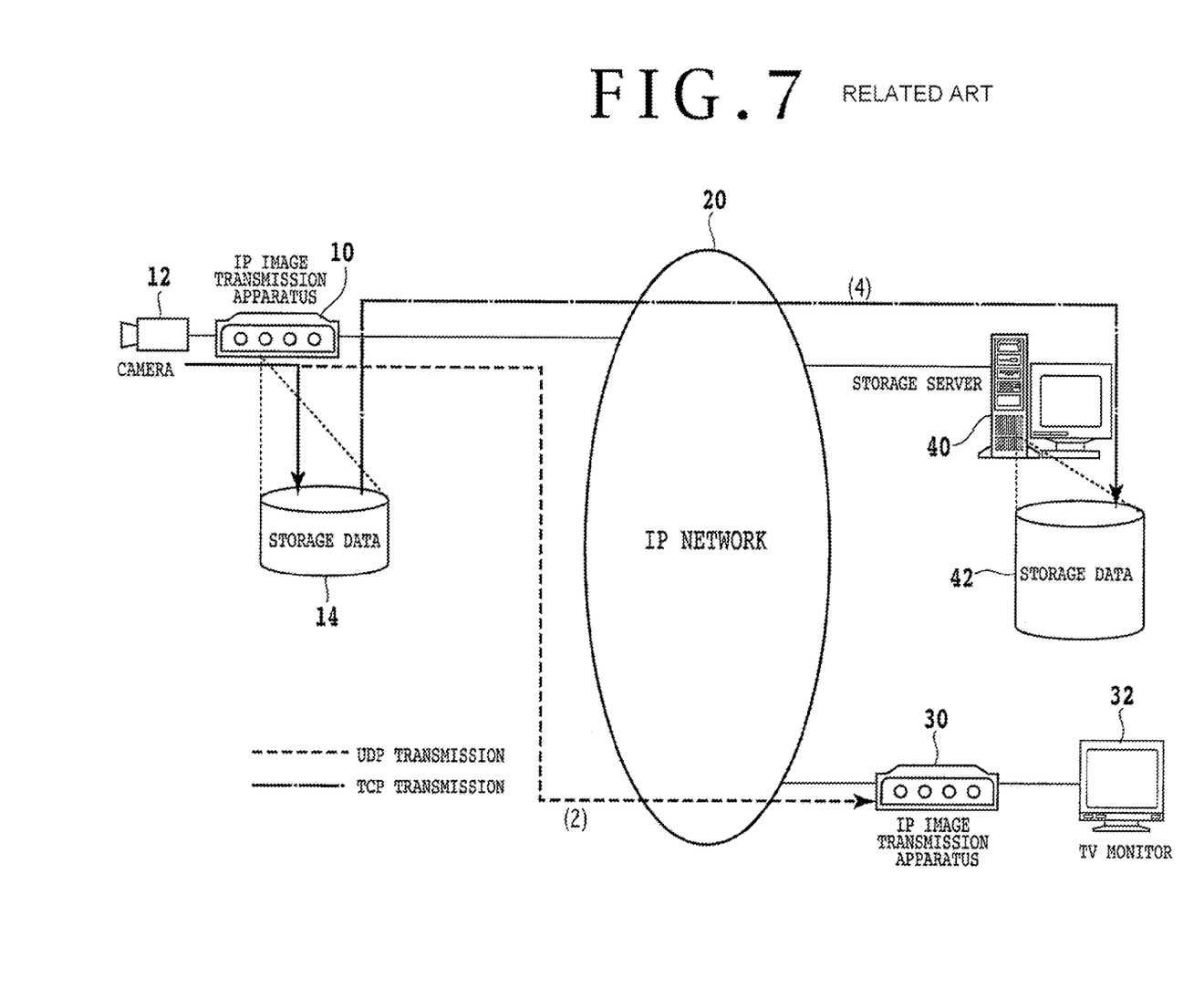
FIG. 7 is a diagram showing an arrangement of an IP image transmission system.

IP image transmission apparatus transmit image and encoded audio data by way of UDP transmission for live distribution and store image and encoded audio data by way of TCP transmission in a server. FIG. 7 is a diagram showing an arrangement of an IP image transmission system. As shown in FIG. 7, an IP image transmission apparatus 10 encodes an image captured by a camera 12 and audio data recorded by a microphone incorporated in the camera 12, and sends the encoded data through an IP network 20 to an IP image transmission apparatus 30 by way of UDP transmission as indicated by (2) in FIG. 7. The IP image transmission apparatus 30 decodes the UDP-transmitted encoded data into image and audio data, and outputs them to a TV monitor 32. The IP image transmission apparatus 10 stores the encoded data in a storage medium 14 disposed therein, and sends the stored encoded data through the IP network 20 to a storage server 40 by way of TCP transmission. The storage server 40 stores the stored data in an HDD 42 disposed therein.

According to a live distribution function, data are transmitted in real time according to the UDP with no retransmission process in order to perform the real-time, low-delay live distribution function on an IP network. For transmitting live distribution data, encoded data according to various encoding processes need to be transmitted at transmission rates equal to or higher than a certain transmission rate. Specifically, for realizing real-time transmission at a certain transmission rate, it is necessary to finish the transmission process within a certain time. A minimum unit of such a certain time is a time required to transmit a single UDP packet (live distribution minimum unit time). The live distribution minimum unit time Tlive is expressed by the following equation (1):

$$Tlive = (\text{encoding rate [bps]})/(8 \times UDP \text{ packet size [byte]}) \quad (1)$$

The encoding rate refers to a bit rate for encoding image and audio data. In order for a server storage function to store data free of frame losses in a server, storage data are transmitted with reliability according to the TCP with a retransmission process. Therefore, it is a minimum requirement to finish both the live distribution function and the server storage function within the live distribution minimum unit time for simultaneously realizing the live distribution function and the server storage function on the IP network.

Figure 8:
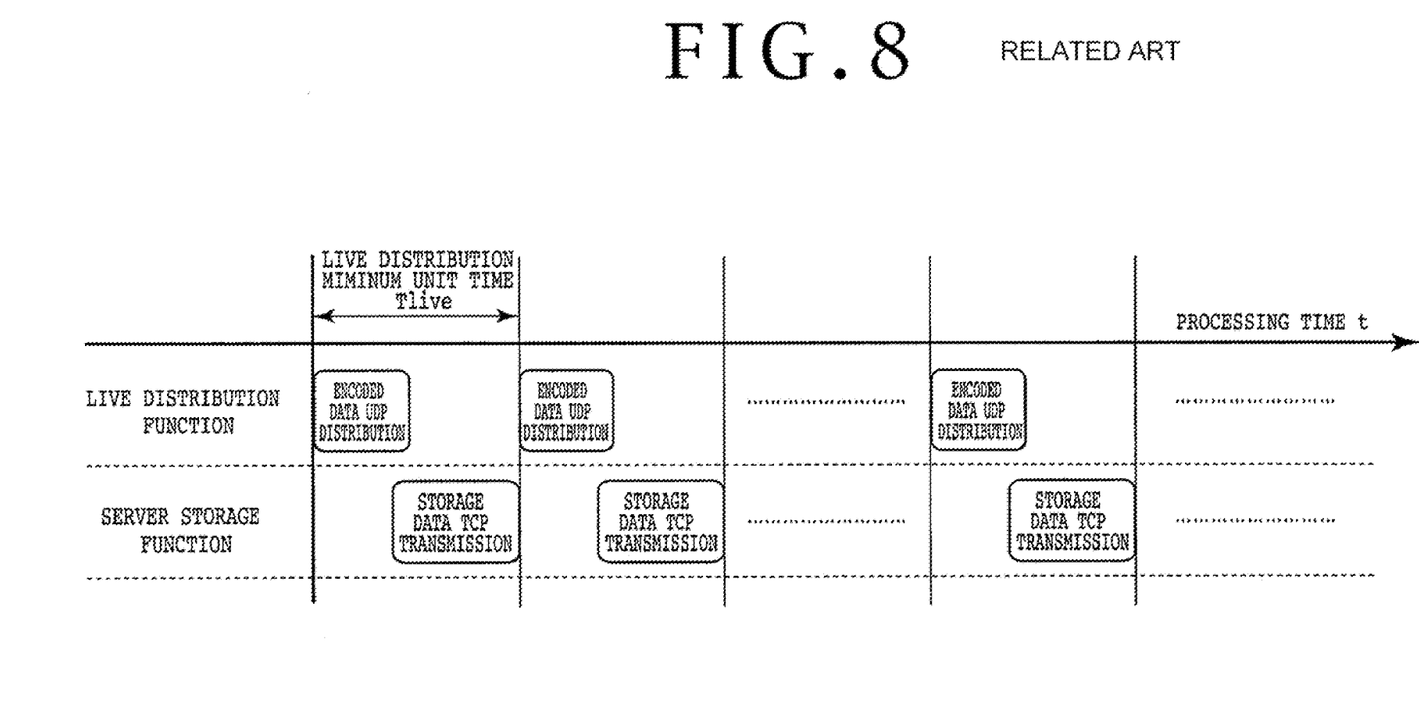
FIG. 8 is a diagram showing a distribution of encoded data transferring times in an IP image transmission apparatus.

FIG. 8 is a diagram showing a distribution of encoded data transfer times in an IP image transmission apparatus. As shown in FIG. 8, an encoded data UDP distribution process is performed within the live distribution minimum unit time Tlive, and a TCP transmission process for the server storage function is performed in idle times other than the UDP distribution process. This is because the UDP distribution process and the TCP transmission process are performed as processes on one CPU. Since TCP packets may be retransmitted for the server storage function, the encoded data are stored in the storage medium and then TCP packets thereof are transmitted. If the same amount of data as in the UDP distribution process cannot be transferred within the idle times, the rate of reading data from the storage medium becomes lower than the rate of writing data into the storage medium, and the storage medium in the IP image transmission apparatus will eventually cause an overflow, resulting in a server storage function breakdown. Accordingly, as described above, in order to realize the live distribution function and the server storage function, the processes for live distribution and server storage have to be performed within a unit time in the IP image transmission apparatus.

Figure 9:
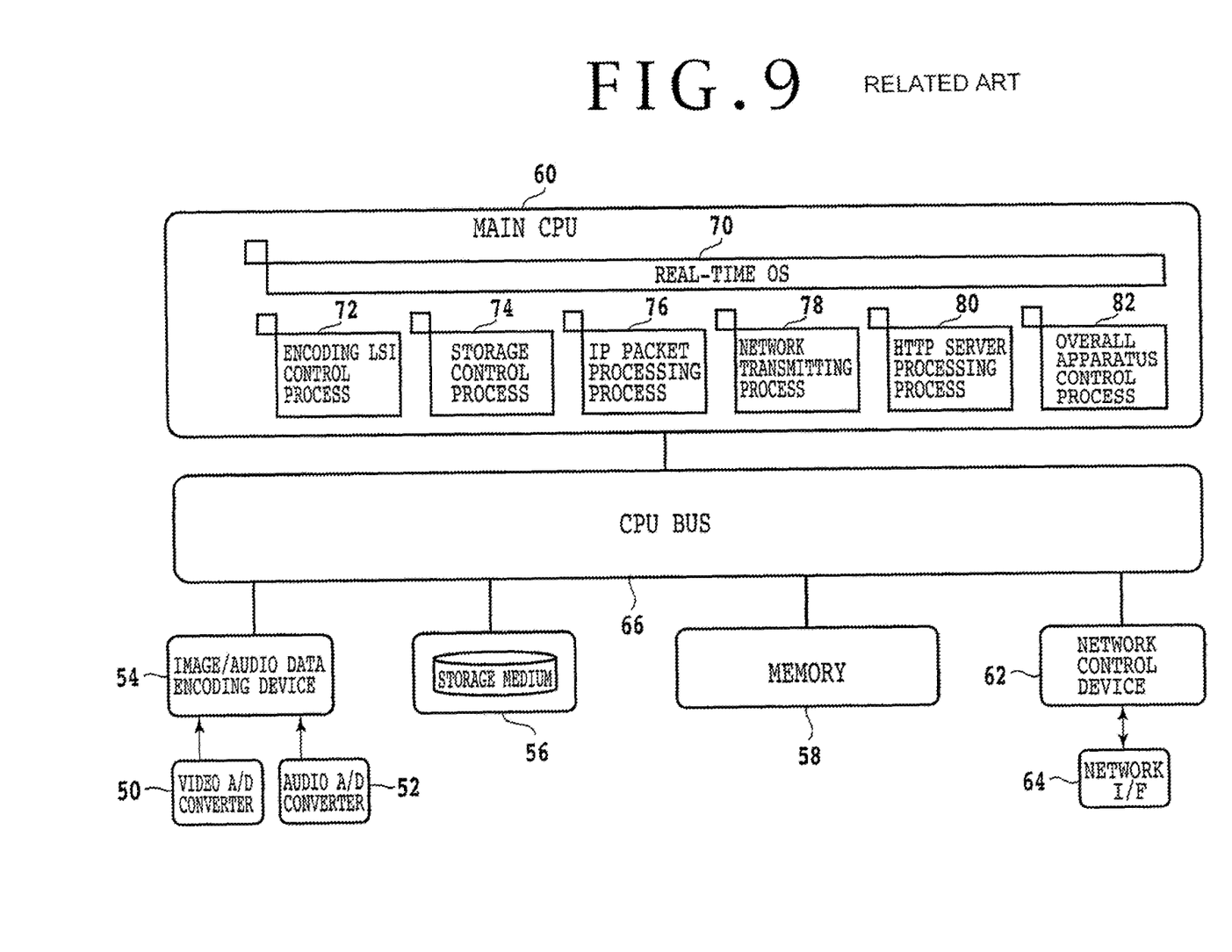
FIG. 9 is a diagram showing an arrangement of a conventional IP image transmission apparatus.

FIG. 9 is a block diagram of a conventional IP image transmission apparatus. As shown in FIG. 9, the IP image transmission apparatus includes a video A/D converter 50, an audio A/D converter 52, an image/audio data encoding device 54, a storage medium 56, a memory 58, a main CPU 60, a network control device 62, a network I/F 64, and a CPU bus 66. The main CPU 60 performs a real-time OS 70, an encoding LSI control process 72, a storage control process 74, an IP packet processing process 76, a network transmitting process 78, an http server processing process 80, and an overall apparatus control process 82.

Figure 10:
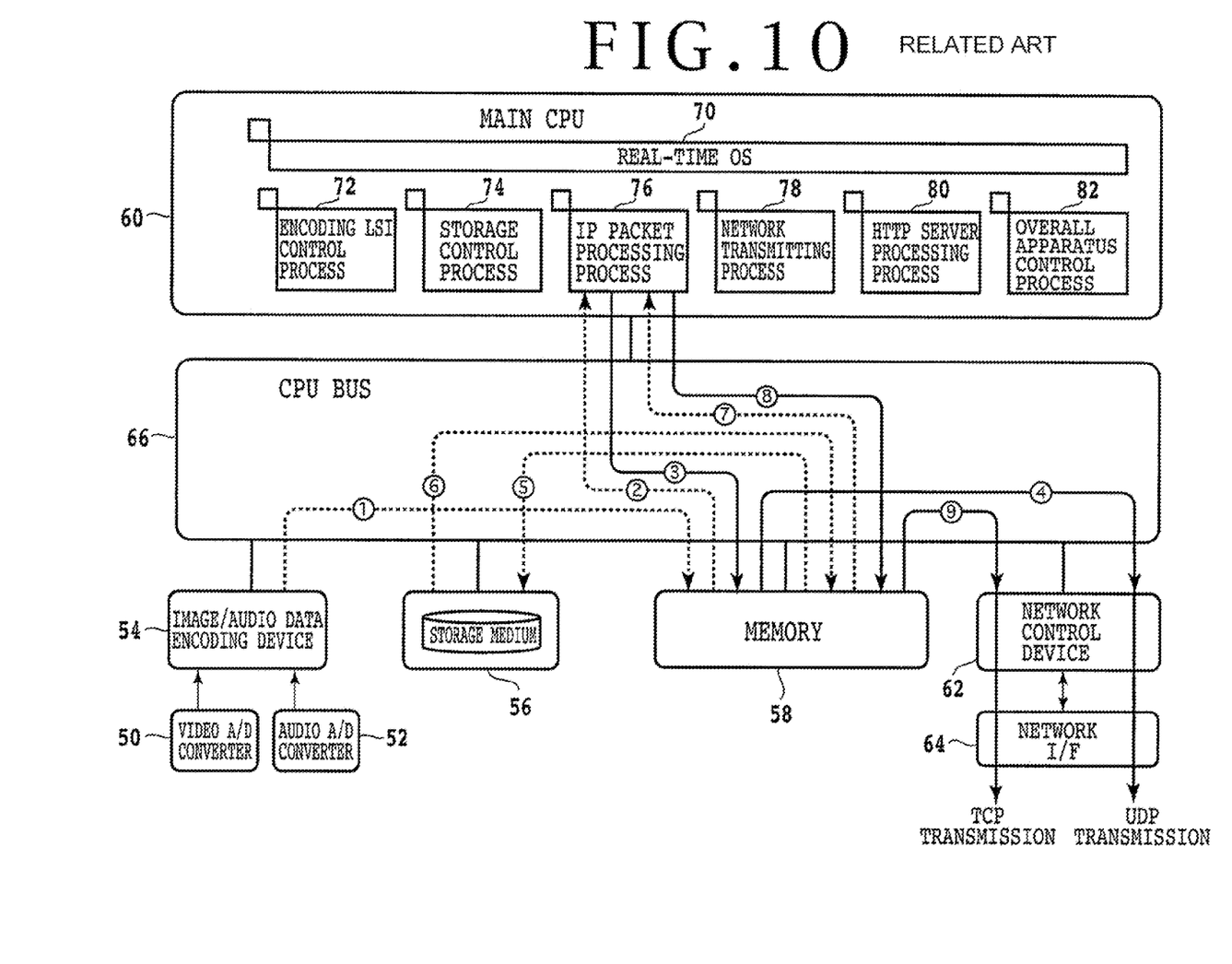
FIG. 10 is a diagram showing data flows in the conventional IP image transmission apparatus.

FIG. 10 is a diagram showing data flows in the conventional IP image transmission apparatus. In the IP image transmission apparatus, nine stream data shown in FIG. 10 are transferred in real time as follows:

(1) Encoded Data Transfer:

The encoding LSI control process 72 transfers encoded data to the memory 58 through the CPU bus 66. The encoded data are generated by the image/audio data encoding device 54 from digital video data converted from analog video data by the video A/D converter 50 and digital audio data converted from analog audio data by the audio A/D converter 52.

(2) Encoded Data Reading:

The IP packet processing process 76 reads the encoded data from the memory 58 through the CPU bus 66.

(3) UDP Packetized Data Writing:

The IP packet processing process 76 converts the encoded data into UDP packets, and writes them into the memory 58 through the CPU bus 66.

(4) UDP Data Sending:

The network transmitting process 78 reads the UDP packets from the memory 58 through the CPU bus 66, and transmits the UDP packets through the network control device 62 and the network I/F 64 to the IP network according to the UDP.

(5) Storage Data Writing:

The storage control process 74 reads the encoded data from the memory 58 through the CPU bus 66, and transfers the encoded data to the storage medium 56.

(6) Storage Data Reading:

The storage control process 74 reads the encoded data from the storage medium 56 through the CPU bus 66, and transfers the encoded data to the memory 58.

(7) Encoded Data Reading:

The IP packet processing process 76 reads the encoded data (storage data) from the memory 58 through the CPU bus 66.

(8) TCP Packetized Data Writing:

The IP packet processing process 76 converts the storage data into TCP packets, and write them into the memory 58 through the CPU bus 66.

(9) TCP Data Sending:

The network transmitting process 78 reads the TCP packets from the memory 58 through the CPU bus 66, and transmits the TCP packets through the network control device 62 and the network I/F 64 to the IP network according to the TCP.

Figure 11:
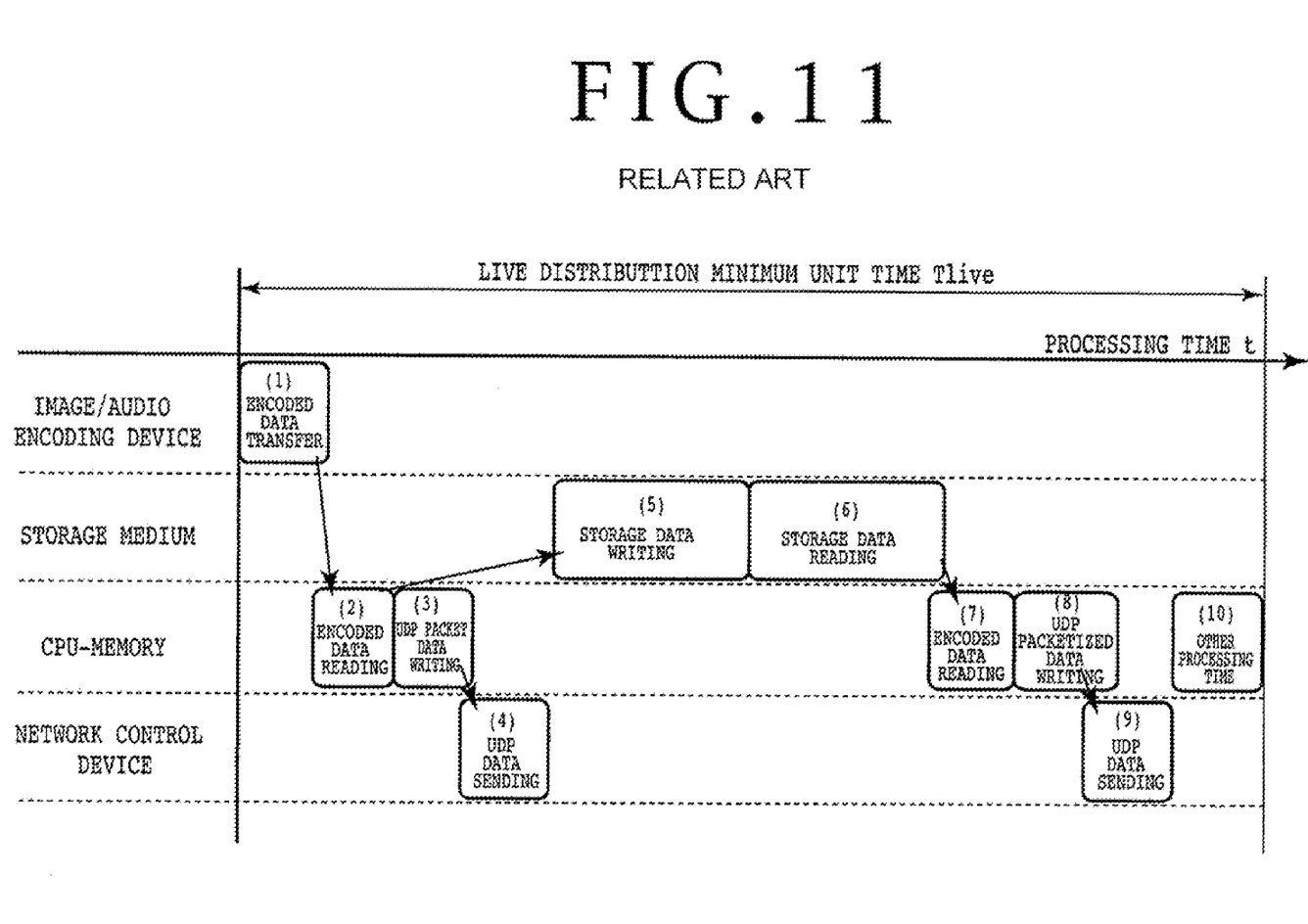
FIG. 11 is a diagram showing a distribution of encoded data transferring times in the conventional IP image transmission apparatus.

FIG. 11 is a diagram showing a distribution of encoded data transferring times in the conventional IP image transmission apparatus. FIG. 11 shows a processing time of the image/audio data encoding device 54, processing times of the storage medium 56, processing times between the CPU 60 and the memory 58, and processing times of the network control device 62 in the live distribution minimum unit time. As shown in FIG. 11, the UDP distribution process from the encoded data transfer (1) through the encoded data reading (2) and the UDP packetized data writing (3) to the UDP data sending (4) is performed, and then the TCP transmission process from the storage data writing (5) through the storage data reading (6), the encoded data reading (7), and the TCP packetized data writing (8) to the TCP data sending (9) is performed. The processing times of the storage data writing (5) and the storage data reading (6) are longer than the other processing times because the accessing rate of the storage medium 56 is lower than the processing rate of the CPU 60 and the processing rate (accessing rate) of the memory 58. Other processes (10) such as a process of communication with the server and an overall apparatus control process are carried out in a time other than the UDP distribution process and the TCP transmission process in the live distribution minimum unit time.

There are needs for an increased encoding rate for increasing the quality of images and sounds for live distribution. The encoding rate shown in FIG. 11 indicates that no remaining time is available if the processes (1) through (10) are performed in the live distribution minimum unit time. A distribution of encoded data transferring times for an encoding rate which is 1.5 times the encoding rate shown in FIG. 11 will be considered below.

Figure 12:
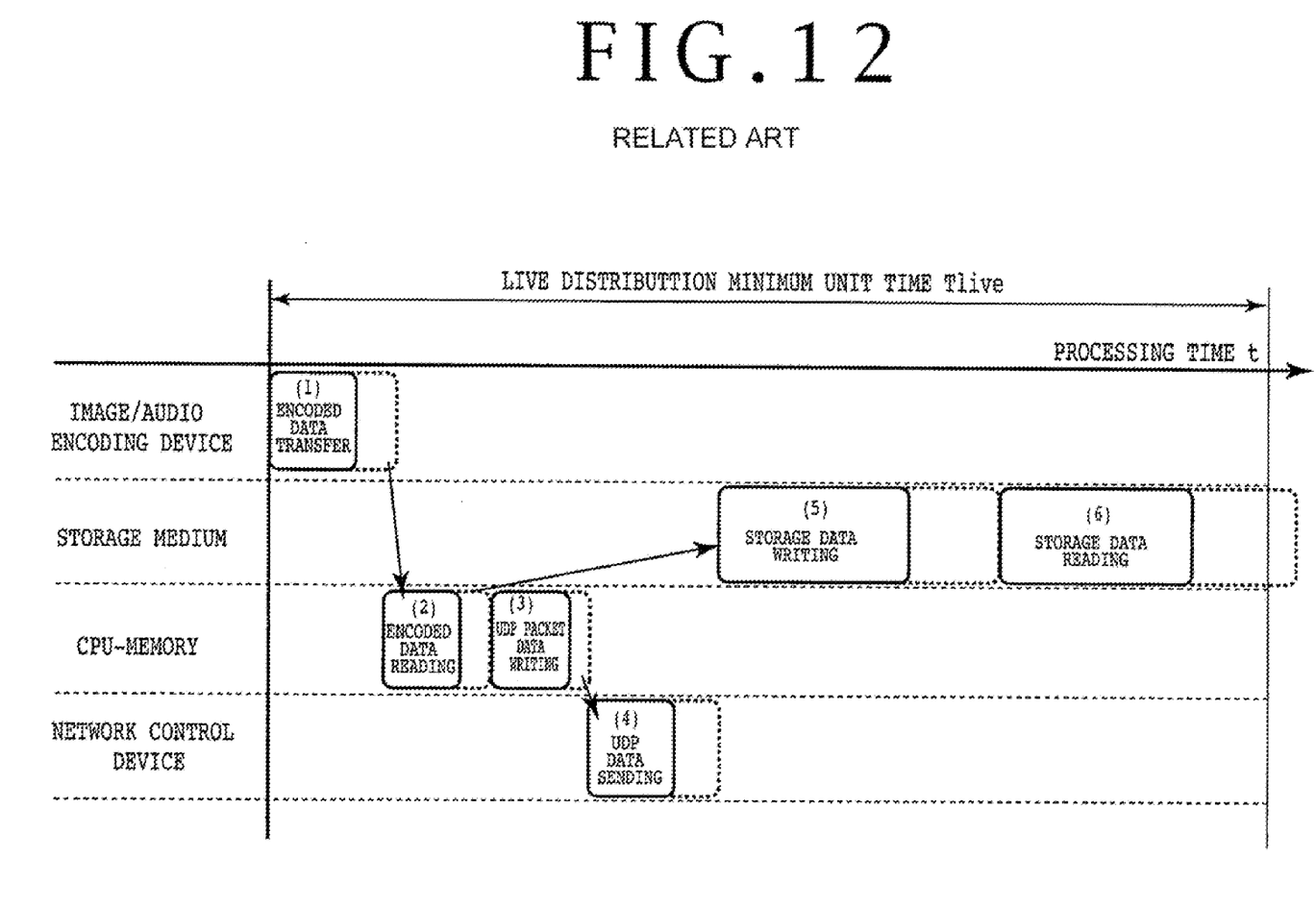
FIG. 12 is a diagram showing a distribution of encoded data transferring times in the conventional IP image transmission apparatus when the encoding rate increases 1.5 times.

FIG. 12 is a diagram showing a distribution of encoded data transferring times in the IP image transmission apparatus for an encoding rate which is 1.5 times the encoding rate. In FIG. 12, the components shown in FIG. 9 remain unchanged. An encoding rate which is 1.5 times the encoding rate shown in FIG. 11 means that the amount of data to be processed in the same live distribution processing unit time as in FIG. 11 increases 1.5 times. Therefore, as indicated by the broken lines in FIG. 12, the UDP distribution processing time from the encoded data transfer (1) to the UDP data sending (4) and the TCP transmission processing time from the storage data writing (5) to the TCP data sending (9) increase 1.5 times. However, as shown in FIG. 11, if there is no room for the encoded data transferring time distribution in the live distribution minimum time, the above processes (1) through (9) will not be finished within the live distribution minimum time, but the minimum unit time will be used up until the storage data reading (6) as shown in FIG. 12, with the remaining three processes remaining unfinished. Therefore, if the encoding rate increases 1.5 times, then the server storage function cannot be realized. One solution is to speed up the processes for the increased encoding rate thereby to increase the transfer rate of the CPU bus. An example in which the transfer rate of the CPU bus is doubled when the encoding rate increases 1.5 times will be described below.

Figure 13:
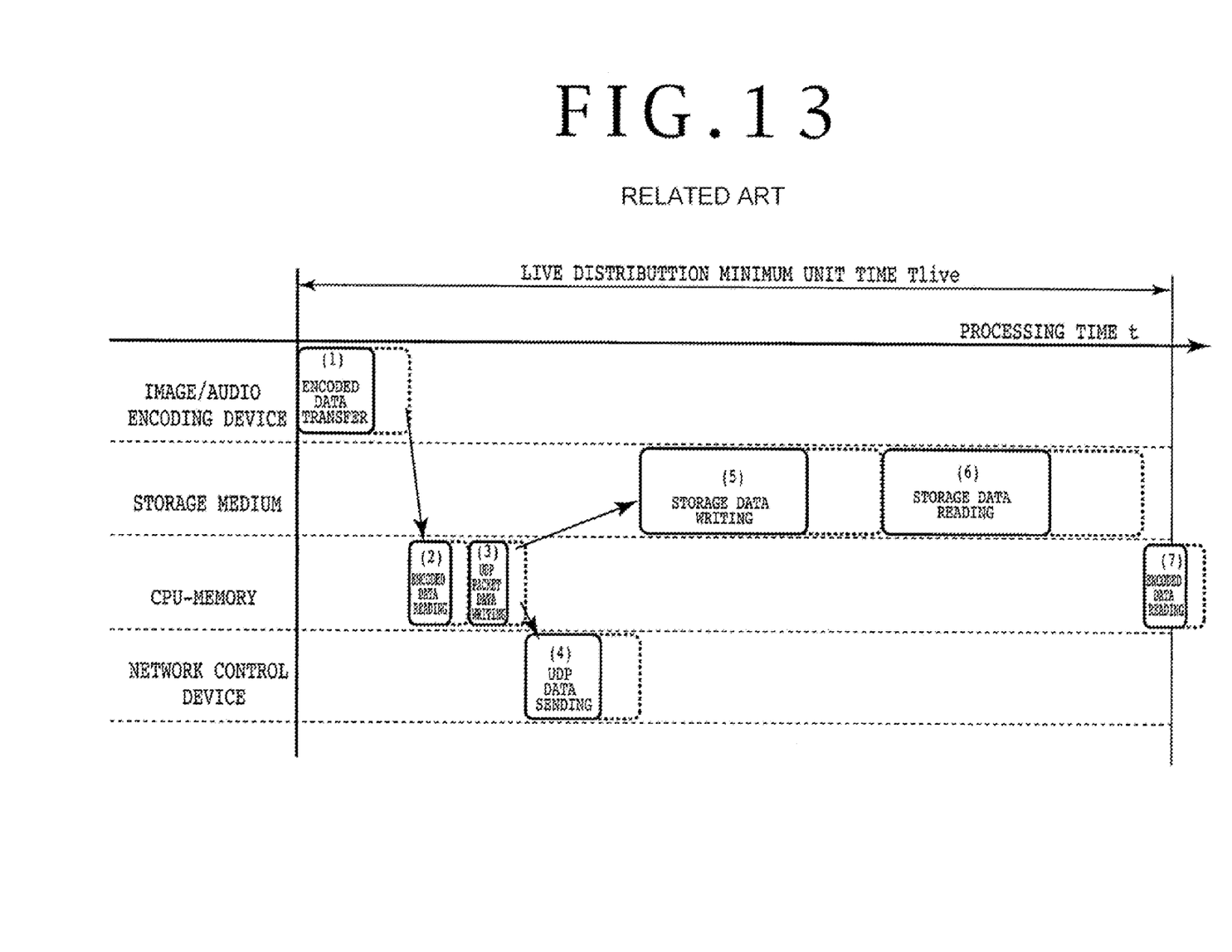
FIG. 13 is a diagram showing a distribution of encoded data transferring times in the conventional IP image transmission apparatus for an encoding rate which is 1.5 times and a CPU bus transfer rate which is doubled.

FIG. 13 is a diagram showing a distribution of encoded data transferring times in the IP image transmission apparatus for an encoding rate which is 1.5 times and a CPU bus transfer rate which is doubled. The solid and broken lines in the processes (1) through (9) in FIG. 13 show, respectively, processing times at the encoding rate shown in FIG. 11 and processing times at the encoding rate which is 1.5 times, when the transfer rate of the CPU bus 66 is doubled. As shown in FIG. 13, the process performed between the CPU 60 and the memory 58 is speeded up, but the processes of the storage data writing (5) and the storage data reading (6) remain unchanged compared with FIG. 12 because the storage medium 56 is slow itself. Therefore, the minimum unit time is used up somewhere in the storage data reading (7), with the remaining two processes remaining unfinished. Consequently, even when the transfer rate of the CPU bus is doubled, the server storage function cannot be realized if the encoding rate increases 1.5 times. For making the apparatus compatible with an increase in the encoding rate while employing the single CPU bus configuration, it is necessary to employ a storage medium which has a doubled accessing time. With the conventional data bus system, however, only the bus has to be speeded up and a high-speed storage medium has to be employed for increasing the encoding rate, as described above.

Using a high-speed bus results in a need for a high-speed CPU, increasing the power consumption and reducing a design margin. Consequently, a lot of resources are consumed in all aspects, e.g., in the form of a high cost, an increased development cost, etc. If a high-speed storage medium is employed, then a cost increase occurs, and an increase in the mounting area is caused. As a result, the apparatus fails to meet requirements for environment resistance, low power consumption, smaller size, etc.

SUMMARY OF THE INVENTION

It is an object of the present invention to provide an IP image transmission apparatus which is capable of meeting requirements for environment resistance, low power consumption, smaller size, etc. and increasing an encoding rate.

According to an aspect of the present invention, there is provided an IP image transmission apparatus for TCP and UDP transmission of encoded data, including a storage medium, a first memory, a first bus, a second bus, an encoder for encoding image and audio data into encoded data and outputting the encoded data to the first bus, an encoded data transfer unit for writing the encoded data output to the first bus into the first memory through the second bus, a storage data writing controller for writing the encoded data output to the first bus into the storage medium through the first bus, and a storage data reading controller for reading storage data written in the storage medium through the first bus and writing the storage data into the first memory through the second bus.

Preferably, the IP image transmission apparatus further includes a second memory, and the encoded data transfer unit writes the encoded data output to the first bus into the second memory, reads the encoded data from the second memory, and writes the encoded data into the first memory through the second bus.

Further preferably, the storage data reading controller writes the storage data read through the first bus into the second memory, reads the encoded data from the second memory, and writes the encoded data into the first memory through the second bus.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
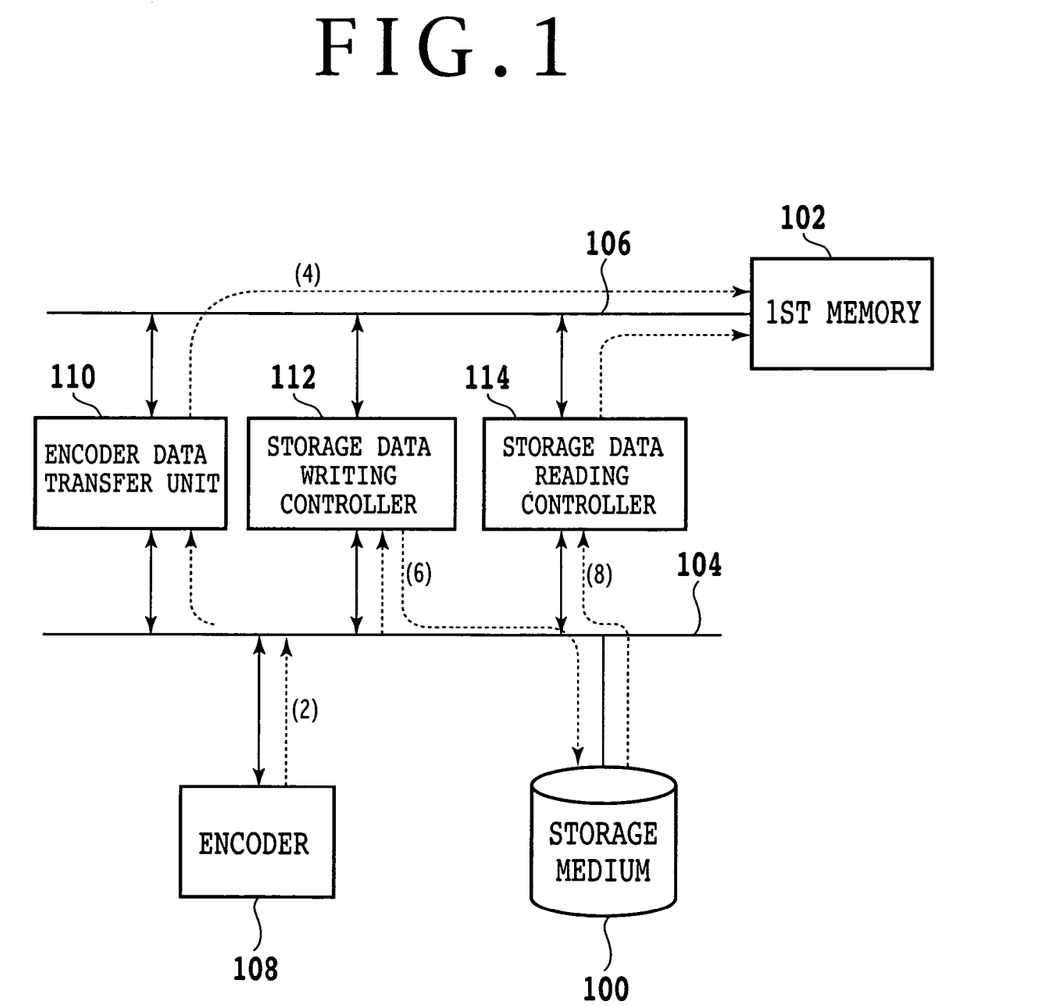
FIG. 1 is a diagram showing the principles of the present invention.

Prior to the description of an embodiment of the present invention, the principles of the present invention will first be described below. FIG. 1 is a diagram showing the principles of the present invention. As shown in FIG. 1, an IP image transmission apparatus includes a storage medium 100, a first memory 102, a first bus 104, a second bus 106, an encoder 108, an encoded data transfer unit 110, a storage data writing controller 112, and a storage data reading controller 114. The encoder 108 encodes image and audio data into encoded data and outputs the encoded data to the first bus 104, as indicated by (2). The encoded data transfer unit 110 writes the encoded data output to the first bus 104 into the first memory 102 through the second bus 106, as indicated by (4).

The storage data writing controller 112 writes the encoded data output to the first bus 104 into the storage medium 100 through the first bus 104, as indicated by (6). At this time, since the storage data are written into the storage medium 100 through the first bus 104, but not through the second bus 106, the process of transferring the encoded data to the first memory 102 through the second bus 106 with the encoded data transfer unit 110, and the process of storing the encoded data into the storage medium 100 with the storage data writing controller 112 can be performed parallel to each other.

The storage data reading controller 114 reads the storage data from the storage medium 100 through the first bus 104, and writes the storage data into the first memory 104 through the second bus 106. At this time, since the storage bus is read from the storage medium 100 through the first bus 104, the first memory 102 can be accessed through the second bus 106 and the storage data can be written thereinto while the storage data are being read through the first bus 104, so that the processing time can be shortened.

Figure 2:
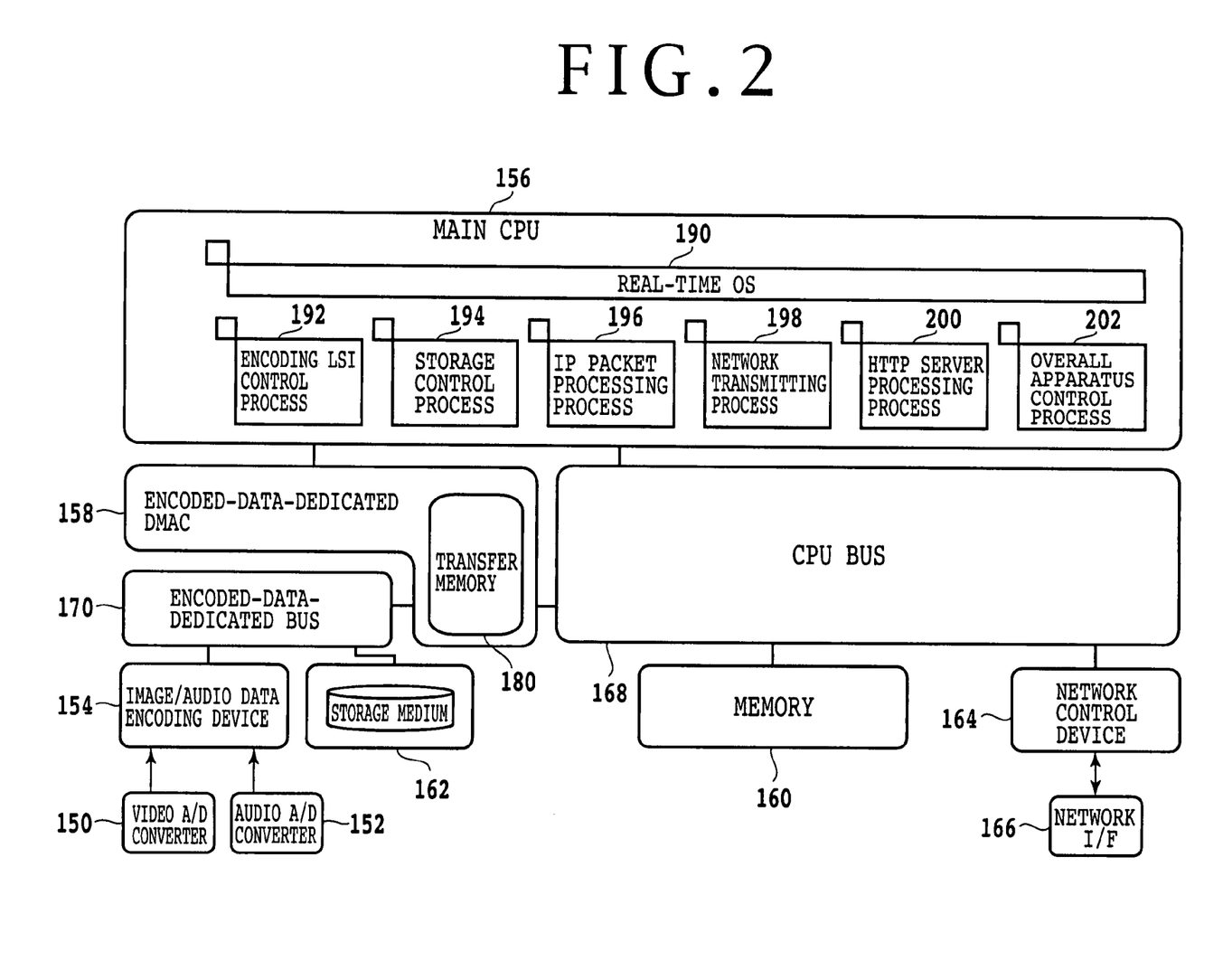
FIG. 2 is a diagram showing an arrangement of an IP image transmission apparatus according to an embodiment of the present invention.

FIG. 2 is a block diagram showing an arrangement of an IP image transmission apparatus according to an embodiment of the present invention. As shown in FIG. 2, the IP image transmission apparatus includes a video A/D converter 150, an audio A/D converter 152, an image/audio data encoding device 154, a main CPU 156, an encoded-data-dedicated DMAC (abbreviated to as "dedicated DMAC") 158, a memory 160, a storage medium 162, a network control device 164, a network I/F 166, a CPU bus 168, and a encoded-data-dedicated bus (abbreviated as "dedicated bus") 170.

The video A/D converter 150 converts an analog image captured by a video camera installed outdoors or the like into a digital image. The audio A/D converter 152 converts an analog audio signal recorded by a microphone into a digital audio signal. The image/audio data encoding device 154 has the following functions: (1) It encodes digital image and audio data according to the MPEG-2 process, and stores the encoded data in a frame memory, not shown. (2) It reads the encoded data from the frame memory according to an instruction from an encoding LSI control process 192 in the main CPU 156 through the dedicated DMAC 158, and outputs the encoded data to the dedicated bus 170.

The main CPU 190 is a CPU for controlling and processing data for IP image transmission, and performs a real-time OS 190, an encoding LSI control process 192, a storage control process 194, an IP packet processing process 196, a network transmitting process 198, an http server processing process 200, and an overall apparatus control process 202. The real-time OS 190 is an operating system for switching between the processes at a high speed for real-time distribution. The encoding LSI control process 192 instructs the dedicated DMAC 158 to transfer the encoded data generated by the image/audio data encoding device 154 to the main memory 168. The storage control process 194 has the following functions: (1) Instructing the dedicated DMAC 158 to store the encoded data in the storage medium 162. (2) Instructing the dedicated DMAC 158 to read the storage data from the storage medium 162 to the memory 160.

The IP packet processing process 196 performs the following processes: (1) Reading the encoded data from the memory 160 to the main CPU 156 through the CPU bus 168. (2) Converting the encoded data read from the memory 160 into UDP packets. (3) Writing the UDP packets into the memory 160 through the CPU bus 168. (4) Reading the storage data from the memory 160 to the main CPU 156 through the CPU bus 168. (5) Converting the storage data read from the memory 160 into TCP packets. (6) Writing the TCP packets into the memory 160.

The network transmitting process 198 performs the following processes: (1) Transferring the UDP packets from the memory 160 to the network control device 164 through the CPU bus 168. (2) Transferring the TCP packets from the memory 160 to the network control device 164 through the CPU bus 168. The http server processing process 200 performs the following processes: (1) Setting an IP address of its own apparatus according to an instruction from a server apparatus. (2) Setting an encoding rate (encoding process) according to an instruction from the server.

The overall apparatus control process 202 has the following functions: (1) Controlling a processing sequence of the encoding LSI control process 192, etc. described later on in order to finish the UDP distribution process, the TCP transmission process, and other processes within the live distribution minimum unit time. (2) Performing a monitoring control process in the apparatus, such as an alarm monitoring process.

The dedicated DMAC 158 has a transfer memory 180, and performs the following processes according to instructions sent from the main CPU 156 through a signal line, not shown: (1) When the dedicated bus 170 is idling, the dedicated DMAC 158 reads necessary encoded data from the image/audio data encoding device 154 to the dedicated bus 170, stores the encoded data in a register, and writes the encoded data into the transfer memory 180 within a unit time. When a certain amount of encoded data is written into the transfer memory 180, the dedicated DMAC 158 reads the encoded data from the transfer memory 180, and writes the encoded data into the main memory 160 through the CPU bus 168. (2) The dedicated DMAC 158 acquires the dedicated bus 170, outputs the encoded data written in the register to the dedicated bus 170 in order to write the encoded data through the output into the storage medium 162, and releases the dedicated bus 170 after the bus cycle. When the writing of the encoded data into the storage medium 162 is over, the dedicated DMAC 158 acquires the dedicated bus 170, outputs next encoded data written in the register to the dedicated bus 170 in order to write the encoded data through the output into the storage medium 162, and releases the dedicated bus 170 after the bus cycle. This process is performed on necessary encoded data in the unit time. (3) The dedicated DMAC 158 reads the storage data written in the storage medium 162 to the transfer memory 180 through the dedicated bus 170. When a certain amount of storage data is read to the transfer memory 180, the dedicated DMAC 158 reads the storage data from the transfer memory 180, and writes the storage data into the main memory 160 through the CPU bus 168. (4) The dedicated DMAC 158 acquires the CPU bus 168 according to a request from the CPU 156.

The transfer memory 180 is a buffer memory. The transfer memory 180 is used for the following reasons: (1) There is a difference between the rate to transfer the encoded data from the image/audio data encoding device 154 through the dedicated bus 170 and the transfer rate of the CPU bus 168. (2) The timing to transfer the encoded data to the memory 160 is controlled. (3) There is a difference between the rate to read the storage data from the storage medium 162 through the dedicated bus 170 and the transfer rate of the CPU bus 168. (4) The timing to write the storage data into the memory 160 is controlled.

The memory 160 is a main memory for storing encoded data and processes and includes a ROM for storing a program corresponding to the encoding LSI control process 192, etc. The storage medium 162 is a recording medium for storing encoded data to be sent for TCP transmission, and has a controller. The controller writes the encoded data on the dedicated bus 170 into the storage medium 162, and reads the storage data from the storage medium 162 to the dedicated bus 170. The network control device 164 serves to interface a network to which the IP image transmission apparatus is connected. The network I/F 166 includes connectors, transformers, etc. for connecting the IP image transmission apparatus to communication cables.

The CPU bus 168 is a bus for writing and reading encoded data between the main CPU 156 and the memory 160, encoded data between the dedicated DMAC 158 and the memory 160, UDP packets, storage data, and TCP packets. The dedicated bus 170 serves to write encoded data into the storage medium 162, read encoded data from the storage medium 162, and read encoded data from the image/audio data encoding device 154.

Figure 3:
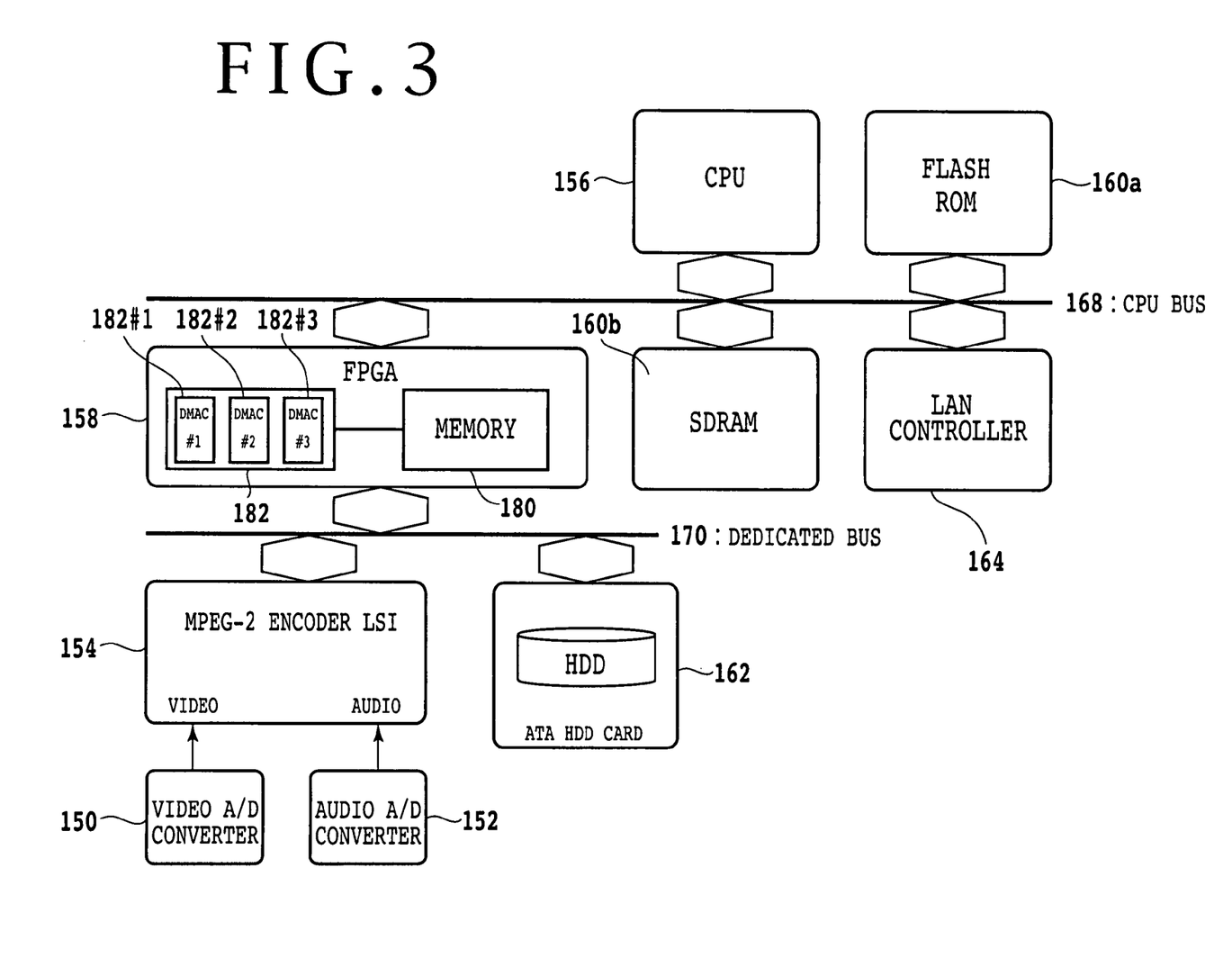
FIG. 3 is a diagram showing an arrangement of the IP image transmission apparatus

FIG. 3 is a diagram showing an arrangement of the IP image transmission apparatus shown in FIG. 2. Those parts shown in FIG. 3 which correspond to those shown in FIG. 2 are denoted by identical reference characters. The image/audio data encoding device 154 includes an MPEG-2 encoder LSI where an encoding rate for simultaneously performing live distribution and server storage functions of the IP image transmission apparatus is 6 Mbps. The main CPU 156 has a clock frequency of 162 MHz, for example. A flash ROM 160a serves as a ROM of the memory 166, and includes an ATA flash card having a transfer rate of about 20 Mbps, for example. An SDRAM 160b serves as a main memory of the memory 160. The dedicated DMAC 158 is an FPGA device, and has a DMAC182#1, a DMAC182#2, a DMAC182#3, and a memory 180.

The network control device 164 includes a LAN controller, for example. The DMAC182#1 is an encoded data LSI control DMAC and performs the following processes according to instructions from the encoding LSI control process 192: (1) When the dedicated bus 170 is idling, it reads encoded data from the image/audio data encoding device 154 to the dedicated bus 170, and writes the encoded data into the register. (2) It writes the encoded data written in the register into the transfer memory 180.

The DMAC182#2 is a storage control DMAC and performs the following processes according to instructions from the storage control process 194: (1) It acquires the dedicated bus 170, and sends a request to write necessary encoded data written in the register through the dedicated bus 170 to the storage medium 162, and releases the dedicated bus 170 after the bus cycle within a unit time. (2) It acquires the dedicated bus 170, reads the storage data from the storage medium 162 through the dedicated bus 170, and writes the storage data into the transfer memory 180.

The DMAC182#3 is a memory controller DMAC and performs the following processes: (1) When a certain amount of encoded data/storage data is written in the transfer memory 180, the DMAC182#3 write the data into the memory 160 through the CPU bus 168. (2) The DMAC182#3 acquires the CPU bus 168 according to an instruction from the IP packet processing process 196 or the network transmitting process 198.

The transfer memory 180 includes a dual-port memory, for example, because encoded data may simultaneously be written in and read from the transfer memory 180. The storage medium 162 includes an ATAHDD card having a transfer rate of about 22 Mbps to meet requirements for small size and light weight, and has a controller. The CPU bus 168 has a bus width of 32 bits and a maximum transfer rate of 324 Mbytes/second, for example.

Figure 4:
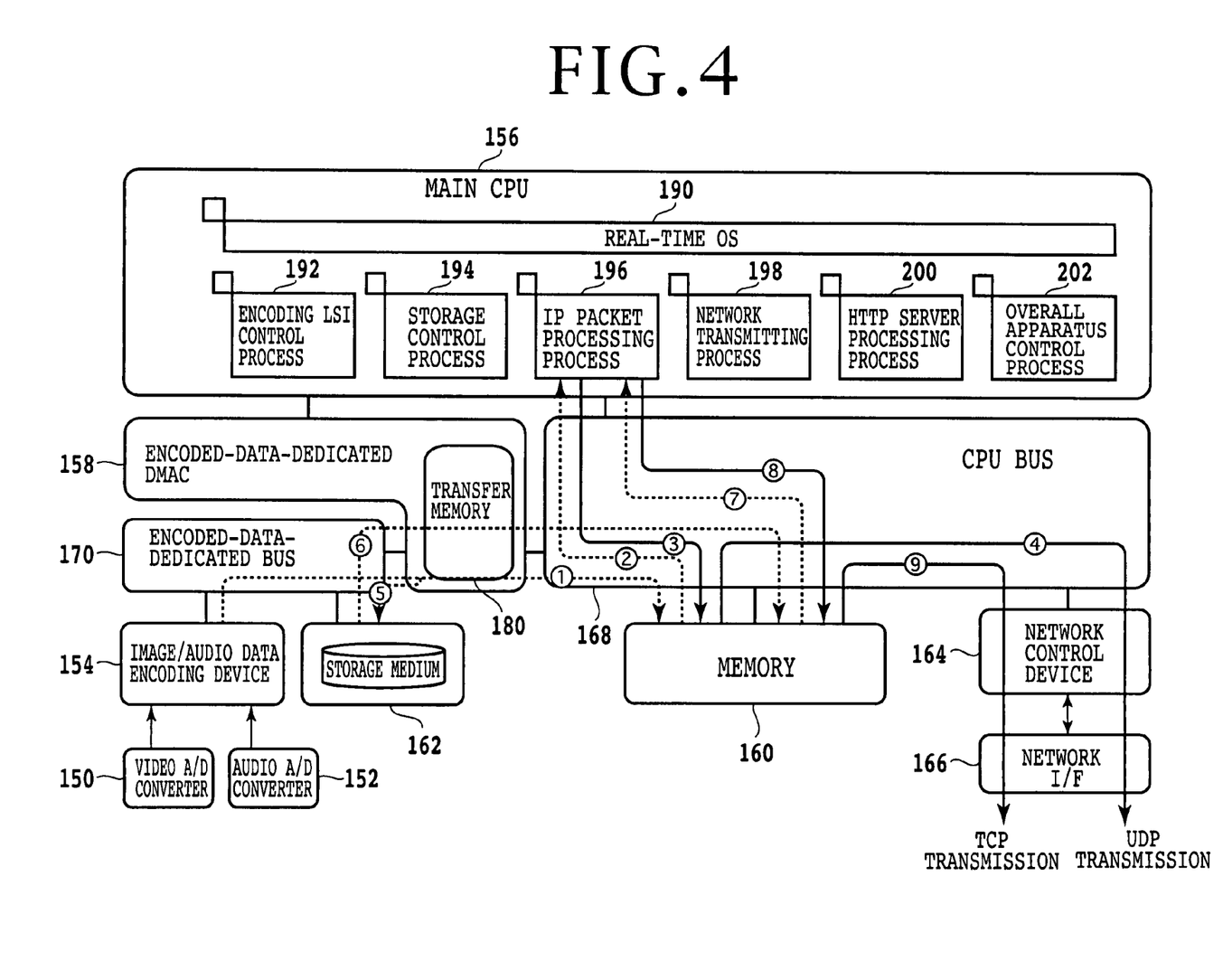
FIG. 4 is a diagram showing data flows in the IP image transmission apparatus.
Figure 5:
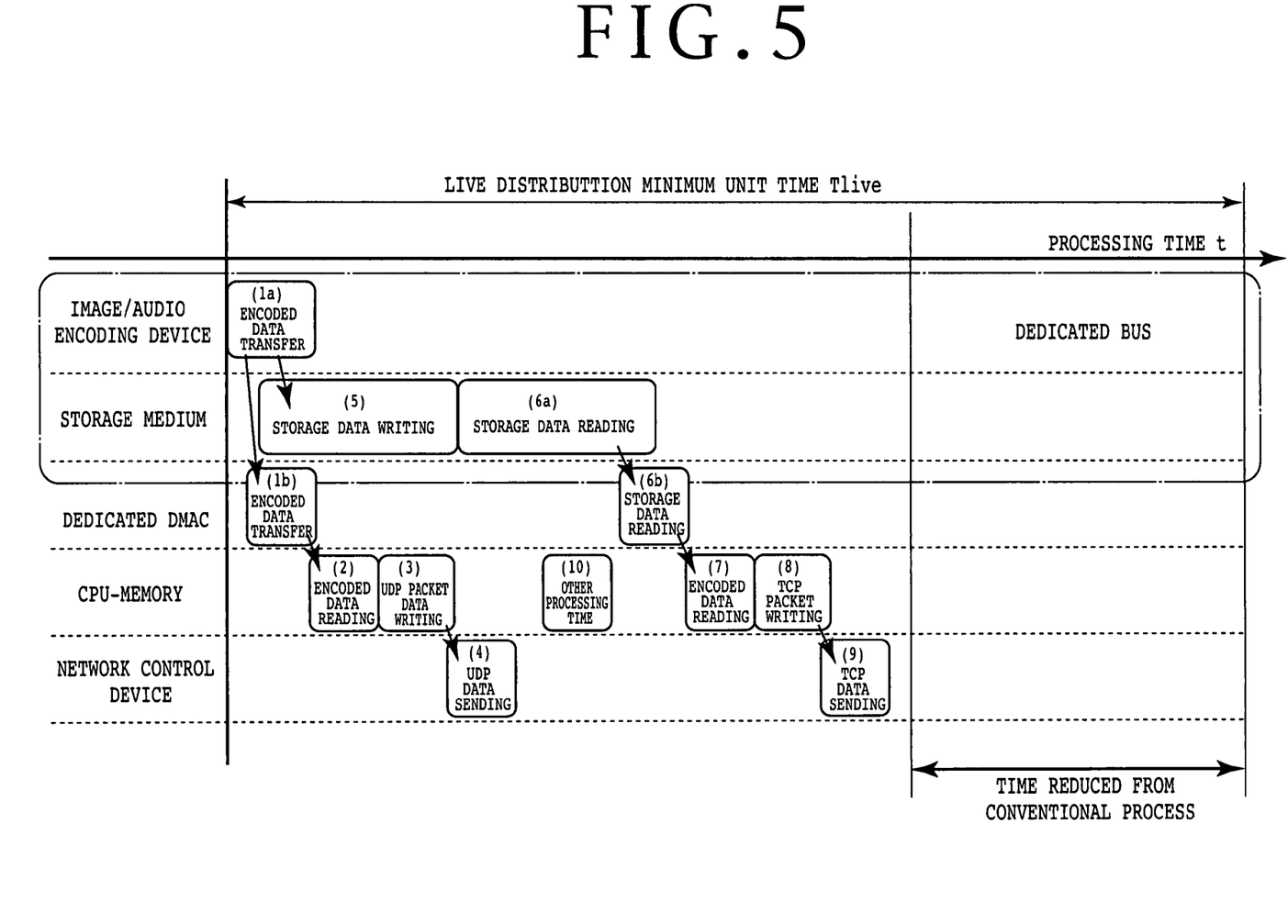
FIG. 5 is a diagram showing a distribution of encoded data transferring times in the IP image transmission apparatus.

FIG. 4 is a diagram showing data flows in the IP image transmission apparatus, and FIG. 5 is a diagram showing a distribution of encoded data transferring times in the IP image transmission apparatus, illustrating a processing time of the image/audio data encoding device 154, processing times of the storage medium 162, processing times of the dedicated DMAC 158, processing times between the CPU 156 and the memory 160, and processing times of the network control device 164. Processes, shown hatched in FIG. 5, of the image/ audio data encoding device 154, the storage medium 162, and the dedicated DMAC 158 use the dedicated bus 170. The live distribution minimum unit time in FIG. 5 is the same as the live distribution minimum unit time in FIG. 11. As shown in FIG. 4, it is necessary to transfer nine stream data in real time in the IP image transmission apparatus. According to the present embodiment, the transfer of such nine stream data is carried out as follow:

(1) Encoded Data Transfer:

The image/audio data encoding device 154 encodes audio and image data according to the MPEG-2 process, and stores the encoded data in a frame memory. At the beginning of the unit time shown in FIG. 5, the overall apparatus control process 202 activates the encoding LSI control process 192. The encoding LSI control process 192 instructs the image/audio data encoding device 154 to read the encoded data through the dedicated DMAC182#1. The image/audio data encoding device 154 outputs the encoded data to the dedicated bus 170 according to the instruction of the DMAC182#1, as shown by (1) in FIG. 4 and (1a) in FIG. 5. The DMAC182#1 reads the encoded data from the dedicated data 170, and writes the encoded data into the register. When the bus cycle is over, the DMAC182#1 releases the dedicated bus 170.

When a bus cycle for storage data writing (5), described later, is finished, releasing the dedicated bus 170, the DMAC182#1 reads next encoded data from the image/audio data encoding device 154 to the dedicated bus 170, and writes the encoded data into the register. The encoded data transfer (1a) from the image/audio data encoding device 154 is performed on encoded data required for UDP packetization. The DMAC182#1 writes the encoded data written in the register into the transfer memory 180, as indicated by (1) in FIG. 4 and (1b) in FIG. 5. The memory control DMAC182#3 reads the encoded data from the transfer memory 180 and writes the encoded data into the memory 160 through the CPU bus 168, parallel to the writing of the encoded data into the transfer memory 180.

(2) Encoded Data Reading:

When the encoded data transfer (1b) to the memory 160 shown in FIG. 5 is finished, the overall apparatus control process 202 activates the storage control process 196. The storage control process 196 reads the encoded data from the memory 160 through the CPU bus 168 as indicated by (2) in FIGS. 4 and 5.

(3) UDP Packetized Data Writing:

The IP packet processing process 196 converts the encoded data read from the memory 160 into UDP packets, and writes the UDP packets into the memory 160 through the CPU bus 168, as indicated by (3).

(4) UDP Packet Data Sending:

When the UDP packetized data writing (3) is finished, the overall apparatus control process 202 activates the network transmitting process 198. The network transmitting process 198 reads the UDP packets from the memory 160 through the CPU bus 168, and outputs the UDP packets to the network control device 164 as indicated by (4) in FIGS. 4 and 5. The network control device 164 transmits the UDP packet data through the network I/F 166 according to the UDP.

(5) Storage Data Writing:

When the encoded data are written into the register by the encoded data transfer (1a) shown in FIG. 5, the overall apparatus control process 202 activates the storage control process 194. The storage control process 194 instructs the DMAC182#2 to store the encoded data. The DMAC182#2 acquires the dedicated bus 170, outputs the encoded data written in the register to the dedicated bus 170 for writing into the storage medium 162, as indicated by (5) in FIG. 4. The DMAC 182#2 releases the dedicated bus 170 after the bus cycle is over.

The controller of the storage medium 162 receives the encoded data from the dedicated bus 170, and stores the encoded data in the storage medium 162 as indicated by (5) in FIG. 5. When the writing of the encoded data in the storage medium 162 is finished, the DMAC 182#2 writes the encoded data into the storage medium 162 through the dedicated bus 170 in the same manner as described above. The above process of writing encoded data into the storage medium 162 is repeated for the encoded data written in the register. The storage data writing (5) is performed by the DMAC182#2 through the dedicated bus 170, the encoded data transfer (1b) by the DMAC 182#3, and the encoded data reading (2) and the UDP packetized data writing (3) by the CPU 156 through the CPU bus 168. Therefore, the process (5) and the processes (1b), (2), (3) can be performed parallel to each other.

(6a) Storage Data Reading:

When the storage data writing (5) is over, the overall apparatus control process 202 activates the storage control process 194. The storage control process 194 instructs the storage control DMAC182#2 to read corresponding encoded data from the storage medium 162. The DMAC182#2 successively reads the storage data from the storage medium 162 to the dedicated bus 170 through the controller of the storage medium 162, and writes the storage data into the transfer memory 180. At this time, the storage data reading (6a) is performed by the DMAC182#2 through the dedicated bus 170. The UDP data sending (4) and the other processes (10) including the process of communication with the server and the overall apparatus control sequence are carried out by the CPU 156 through the CPU bus 168. Therefore, the process (6a), and the process (4) and the other processes (10) can be performed parallel to each other.

(6b) Storage Data Reading:

When the storage data are written in the transfer memory 180, the DMAC182#3 reads the storage data from the transfer memory 180 and writes the storage data into the memory 160 through the CPU bus 168 parallel to the process (6a), as indicated by (6) in FIG. 4 and (6b) in FIG. 5.

(7) Encoded Data Reading:

When the storage data reading (6b) shown in FIG. 5 is finished, the overall apparatus control process 202 activates the IP packet processing process 196. The IP packet processing process 196 reads the storage data from the memory 160 to the CPU bus 168 as indicated by (7) in FIGS. 4 and 5.

(8) TCP Packet Data Writing:

The IP packet processing process 196 receives the storage data read to the CPU bus 168 and converts the storage data into TCP packets as indicated by (8) in FIGS. 4 and 5. The IP packet processing process 196 writes the TCP packet data into the memory 160 through the CPU bus 168.

(9) TCP Data Sending:

When the TCP data writing (8) shown in FIG. 5 is finished, the overall apparatus control process 202 activates the network transmitting process 198. The network transmitting process 198 reads the TCP packet data from the memory 160 to the CPU bus 168 through the memory control DAMC182#3, and outputs the TCP packet data to the network control device 164, as indicated by (9) in FIGS. 4 and 5. The network control device 164 transmits the TCP packet data through the network I/F 166 according to the TCP.

(10) Other Processes:

During an idling time between the UDP packet process and the TCP packet process, e.g., when the UDP data sending (4) is finished, the overall apparatus control process 202 performs overall apparatus control sequences including the process of communication with the server and the overall apparatus control sequence between the CPU 156 and the memory 160, as indicated by (10) in FIG. 5.

As shown in FIG. 5, the storage data writing (5) and the encoded data transfer (1b), the encoded data reading (2) and the UDP packet data writing (3), and the storage data reading (6a) and the UDP data sending, and the other processes (10) can be performed parallel to each other, the encoded data transferring time is reduced about 30% from the conventional process.

Figure 6:
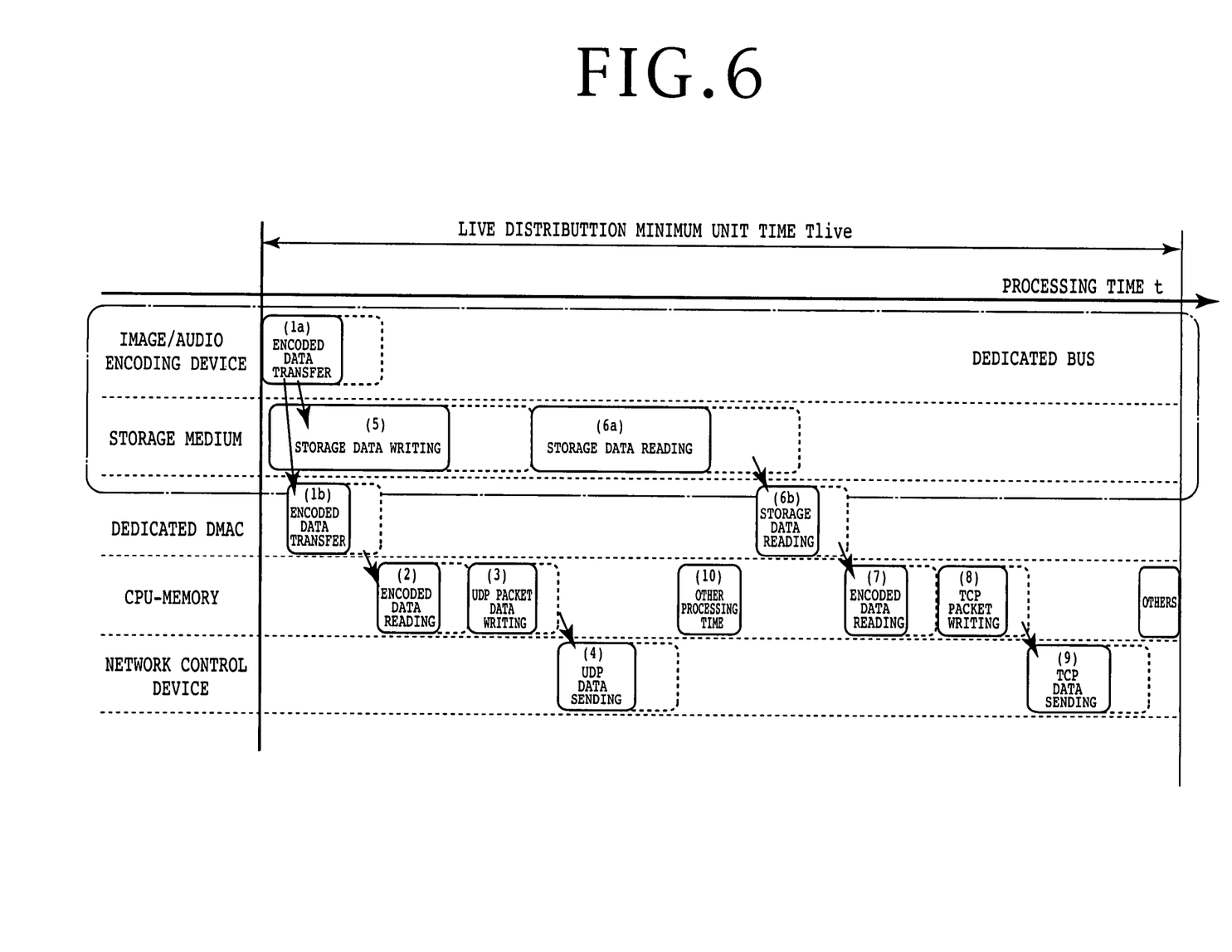
FIG. 6 is a diagram showing a distribution of encoded data transferring times in the IP image transmission apparatus when the encoding rate increases 1.5 times.

FIG. 6 is a diagram showing a distribution of encoded data transferring times in the IP image transmission apparatus when the encoding rate increases 1.5 times. As indicated by the broken lines in FIG. 6, since the amount of data to be processed in the minimum unit time is 1.5 times, the processing time of the encoded data transfer (1a), etc. is 1.5 times the processing time shown in FIG. 5. Even though there is no room for the UDP sending process, the TCP sending process, and the other processes in the live distribution minimum unit time according to the conventional process, as shown in FIG. 11, when the processing time is reduced about 30% from the conventional process as shown in FIG. 5, the processes can be performed within the unit time even if the encoding rate increases 1.5 times as shown in FIG. 6.

According to the present invention, as described above, a dedicated bus is provided to allow UDP and TCP processes based on accessing a memory through a CPU bus and processes for writing data into and reading data from a storage medium through the dedicated bus to be performed parallel to each other. An encoded data transferring time can be shortened for an increased encoding rate even if the transfer rates of the storage medium and the CPU bus are not increased.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An IP image transmission apparatus for TCP and UDP transmission of encoded data, comprising:
   a first bus;
   a storage medium directly connected to said first bus;
   a first memory;
   a second bus;
   a second memory that is a dual port memory and that is able to read and write simultaneously;
   an encoder for encoding image and audio data into encoded data and outputting the encoded data to said first bus;
   an encoded data transfer unit for writing the encoded data output to said first bus into said first memory through said second bus;
   a storage data writing controller for writing the encoded data output to said first bus into said storage medium through said first bus; and
   a storage data reading controller for reading storage data written in said storage medium through said first bus and writing the storage data into said first memory through said second bus, wherein
   said encoded data transfer unit writes the encoded data output to said first bus into said second memory, reads other encoded data from said second memory simultaneously with the writing of the encoded data into said memory, and writes the other encoded data into said first memory through said second bus.

2. The IP image transmission apparatus according to claim 1, wherein said storage data reading controller writes said storage data read through said first bus into said second memory, reads the encoded data from said second memory, and writes the encoded data into said first memory through said second bus.

3. The IP image transmission apparatus according to claim 1, wherein the writing of said storage data into said storage medium through said first bus and the reading of said storage data from said storage medium through said first bus, and the writing of the encoded data into said first memory through said second bus and the reading of the encoded data from said first memory through said second bus are processed parallel to each other.

4. The IP image transmission apparatus according to claim 1, further comprising a UDP processor for reading encoded data from said first memory through said second bus immediately after encoded data to be processed in a unit time are written into said first memory, converting said encoded data into UDP packets, writing the UDP packets into said first memory through said second bus, reading the UDP packets from said first memory, and sending the UDP packets.

5. The IP image transmission apparatus according to claim 4, further comprising said storage data reading controller for reading the storage data from said second memory after elapse of a predetermined period of time after said UDP data are sent, writing the storage data into said first memory, reading storage data from said first memory through said second bus immediately after storage data to be processed in a unit time are written into said first memory, and a TCP processor converting the encoded data into TCP packets, writing the TCP packets into said first memory through said second bus, reading the TCP packets from said first memory, and sending the TCP packets.

6. The IP image transmission apparatus according to claim 1, wherein said storage data writing controller stores the encoded data output to said first bus in a register, releases said first bus after acquiring said first bus for a bus cycle thereof, and writes next encoded data stored in said register into said storage medium through said first bus when the writing of said encoded data into said storage medium is finished, and said encoder outputs next encoded data to said first bus when said storage data writing controller releases said first bus.

\* \* \* \* \*